United States Patent [19]

Sigg

[11] 4,247,157

[45] Jan. 27, 1981

[54] CANT SEGMENT-RADIAL BEARING FOR HEAVILY LOADED HIGH-SPEED SHAFTS

[75] Inventor: Hans Sigg, Mutschellen, Switzerland

[73] Assignee: Maag Gear-Wheel & Machine Company Ltd., Zürich, Switzerland

[21] Appl. No.: 89,588

[22] Filed: Oct. 29, 1979

[30] Foreign Application Priority Data

Nov. 10, 1978 [CH] Switzerland .................. 11586/78

[51] Int. Cl.³ .............................................. F16C 17/03
[52] U.S. Cl. ....................................... 308/73; 308/76; 308/122
[58] Field of Search ................... 308/73, 76, 122, 121, 308/107, 106, 77

[56] References Cited

U.S. PATENT DOCUMENTS

| | | | |
|---|---|---|---|
| 3,887,245 | 6/1975 | Rouch | 308/73 |
| 3,923,125 | 12/1975 | Rosenthal | 308/76 |
| 4,113,324 | 9/1978 | Rohr | 30/122 |

FOREIGN PATENT DOCUMENTS 2154217 5/1972 Fed. Rep. of Germany .

*Primary Examiner*—Lenard A. Footland
*Attorney, Agent, or Firm*—Werner W. Kleeman

[57] ABSTRACT

A cant or tiltable segment-radial bearing comprises a support segment and two guide segments in which there is mounted a shaft. The shaft can be sprayed with lubricant by means of nozzle tubes which are arranged in the intermediate spaces between the support segment and each of the guide segments and in the intermediate space between both of the guide segments, respectively. The nozzle tubes extend in spaced relationship from such segments essentially parallel to the shaft axis. Since the support segment has a large width in relation to the diameter of the shaft an intensive lubrication of such support segment is required, wherefore this support segment is subdivided by a lubricant outflow groove which extends in the circumferential direction.

9 Claims, 2 Drawing Figures

CANT SEGMENT-RADIAL BEARING FOR HEAVILY LOADED HIGH-SPEED SHAFTS

BACKGROUND OF THE INVENTION

The present invention relates to a new and improved construction of a cant segment-radial bearing—also referred to as a tiltable segment-radial bearing—for heavily loaded high-speed shafts, especially the shafts of turbo sets and drives, typically turbo-generator units, athough other fields of application are obviously contemplated.

Generally speaking, the cant segment-radial bearing is of the type comprising at least one support segment arranged to be cantible or tiltable in the load direction of a bearing housing and at least two guide segments arranged in the counterload direction of the bearing housing. Intermediate spaces are provided between the individual segments and a lubrication circulation system is provided which contains an infeed line, opening into the bearing housing, for a cooled lubricant which is under pressure.

Cant segment-radial bearings of the type here of interest are particularly used in conjunction with shafts having a circumferential speed of 70 m/sec and more at the outermost bearing journal diameter.

Such bearings have been disclosed, for instance, in German Pat. Publication No. 2,154,217 and the publication entitled "Brown Boveri-Mitteilungen", Nr. 6-77, pages 309 to 320. They have been developed in an attempt to provide a bearing which is capable or withstanding high specific loads and having as small as possible energy losses. It is known that the bearing losses at large turbo sets usually are in the order of magnitude of 0.5% of the machine output and, even in there is provided particularly advantageous bearing constructions, hardly can be reduced below 0.3%. Therefore, it will be readily perceivable that with a machine having a 1300 megawatt output there still exist power losses in the order of magnitude of 4,000 to 6500 kilowatts. Notwithstanding cooling of the lubricant within a cooling unit arranged externally of the bearing the bearing losses lead to pronounced heating of the segments, and thus, the specific loadability must be held within very narrow limits. In the case of highly loaded shafts, for instance shafts of turbine rotors having a mass of 100 tons and more, it is therefore necessary to have bearing journal diameters up to 900 milimeters. However, the larger the bearing journal diameter that much greater is the circumferential speed for a given rotational speed, and this in turn again is decisively responsible for heating of the lubricant in the bearing gaps.

SUMMARY OF THE INVENTION

Therefore, with the foregoing in mind it is a primary object of the present invention to provide a new and improved construction of a cant segment-radial bearing for heavily loaded high-speed shafts which is not afflicted with the aforementioned drawbacks and shortcomings discussed above.

Another and more specific object of the present invention aims at a new and improved construction of a cant segment-radial bearing of the previously mentioned type which is structured such that the bearing journal diameter can be maintained smaller than possible with the state-of-the-art bearings of this species for the same load and rotational speed.

Yet a further significant object of the present invention aims at providing a new and improved construction of cant segment-radial bearing for heavily loaded high-speed shafts which is relatively simple in construction and design, economical to manufacture, extremely reliable in operation, and allows for high speed performance of heavily loaded shafts even with reduced journal diameter.

Still a further significant object of the present invention aims at the provision of a tiltable segment-radial bearing for heavily loaded high-speed shafts which is provided with means for lubricating the segments of the bearing to permit efficient high speed running of the shaft with reduced bearing journal diameter even when operating at the same load and rotational speed of the shaft as with conventional bearings.

Now in order to implement these and still further objects of the invention, which will become more readily apparent as the description proceeds, the cant segment-radial bearing of the present development is manifested by the features that at the lubricant infeed line there are arranged nozzles in at least one intermediate space, these nozzles being capable of producing free lubricant jets which are directed immediately upon the shaft. Consequently, there is realized the advantage that at least a part of the lubricant which has been introduced into the bearing housing in a cooled state reaches the surface of the shaft, in other words the bearing or shaft journal, without having been appreciably heated along its path to this location, as such is otherwise the case with the heretofore known bearings of this type. More specifically, in the prior art radial bearings of the type under discussion the lubricant flows along one of the segments and/or through a channel through a segment, before it reaches the bearing gap between the shaft and a subsequent segment. The lubricant jets which are provided in accordance with the teachings of the invention afford the further beneficial result that they tend to displace at least to a certain degree the heated lubricant film which adheres to the shaft, whereas this lubricant film, with the heretofore known type of cant segment-radial bearings of the type under discussion moves for the most part from one bearing gap into the next bearing gap and essentially first then mixes at that location with the freshly infed lubricant.

Moreover, the spraying of the lubricant affords the advantage that the quantity of lubricant which is infed per unit of time can be exactly dosed.

With prior art similar type bearings, where the lubricant is infed by means of a trough or the like to the individual segments, it is necessary to continuously maintain in readiness an appreciable quantity of excess lubricant, so that there can be ensured for adequate lubrication over the entire bearing width throughout all operating conditions. Consequently, at high rotational speeds of the shaft generally too much lubricant is introduced into the trough at the beginning of the support segment, especially however in the trough between the shaft and the guide segments, so that there is unnecessarily increased the development of heat in the lubricant.

With preferred constructional embodiments of the invention the lubricant jets are screened against lubricant which tends to spatter in the bearing housing. In this way there is beneficially extensively avoided any mixing of heated lubricant with the freshly infed lubricant prior to its impacting against the shaft, i.e. the shaft or bearing journal.

Advantageously the infeed line terminates in at least one nozzle tube which extends parallel to the shaft in spaced relationship from both neighboring segments. With this arrangement there is also advantageously secured a screen or shield at each nozzle tube or in the neighborhood thereof, which screens the outflowing lubricant jets from heated lubricant which is spattered.

A particularly advantageous construction of the invention contemplates that a first group of nozzles, arranged shortly behind the outlet edge of at least one segment, is directed at an inclination with respect to the shaft opposite to its direction of rotation, and a second group of nozzles, arranged shortly before the inlet edge of the following segment, is directed likewise at an inclination with respect to the shaft in the direction of rotation thereof. Under the expression "outlet edge of a segment" there is to be understood that edge at which a random point at the mounted surface of the shaft departs from the region of influence of the related segment. In corresponding manner the expression "inlet edge of the following segment" is intended to mean that edge at which the aforementioned point arrives at the region of influence of the next segment in the direction of rotation of the shaft. The described further development of the invention affords the advantage that it renders possible a particularly effective separation between the lubricant heated in one of the bearing gaps and the cooled infed lubricant. The heated lubricant is peeled to a certain extent from the shaft by the lubricant jets emanating from the nozzles of the first group, so that at most insignificant residues of the heated lubricant can reach the segment which follows in the direction of rotation. This following segment has infed thereto fresh cooled lubricant by the nozzles of the second group. This infed freshly cooled lubricant, until such time that it enters the bearing gap of the following segment, is not exposed to the danger that it will admix with appreciable quantities of heated lubricant.

The described inventive features can be further particularly advantageously augmented by providing a construction of bearing wherein the support segment is wider than the guide segments, and there is to be understood under the expression "width of the segments" their expanse in a direction essentially parallel to the rotational axis of the shaft. This design is predicated upon the recognition that guide segments of the same width as the support segment are not only unnecessary but in fact undesirable, due to the lower specific loading of the guide segments, since the development of heat in the lubricant increases with increasing width of the guide segments.

If the width of the guide segments, as is conventional with the state-of-the-art species of bearings, is approximately 0.8 to 1.0 times as large as the diameter of the shaft within the bearing (this diameter is also referred to herein as the bearing journal diameter), then the support segment according to the invention preferably has a width which amounts to 1.2 to 2.2 times the size of the diameter of the shaft, and the support segment is provided at its central region with a lubricant outflow groove which extends in the circumferential direction. Such design was heretofore considered to be impossible in the case of cant segment-bearings; it was thought to be absolutely necessary, on the one hand, to limit the ratio of the width of the segment to the diameter of the shaft or the bearing journal to at most 1.0 and, on the other hand, to avoid any interruption in the bearing surface of the support segment. If, on the other hand, according to the invention there can be obtained a ratio of the width to diameter in a range of 1.2 to 2.2 to 1, then this means that for a given maximum permissible value of the specific bearing load the shaft or bearing journal diameter can be dimensioned $\sqrt{1.2}$ to $\sqrt{2.2}$ times smaller, and thus, the circumferential speed can be maintained smaller in the same relationship. By virtue of the foregoing there is realized the further advantage that the friction losses at the bearing gaps can be maintained smaller. This in turn again provides the beneficial result that the anti-friction films tend to heat up less, and therefore, are capable of withstanding a higher specific load. Dimensioning of the segments and arranging a lubricant outflow groove in the support segment, as contemplated by the invention, and specifically wherein the width of the guide segments is approximately 0.8 to 1.0 times as great as the diameter of the shaft and the support segment has a width which is about 1.2 to 2.2 times as large as the diameter of the shaft, and the support segment is provided at its central region with a lubricant outflow groove extending in the circumferential direction, constitutes a particularly advantageous augmentation of the aforedescribed lubrication arrangement and technique. In fact, it has been found that the just mentioned construction also for itself can be advantageously employed with conventional known cant segment-radial bearings of the heretofore mentioned species.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
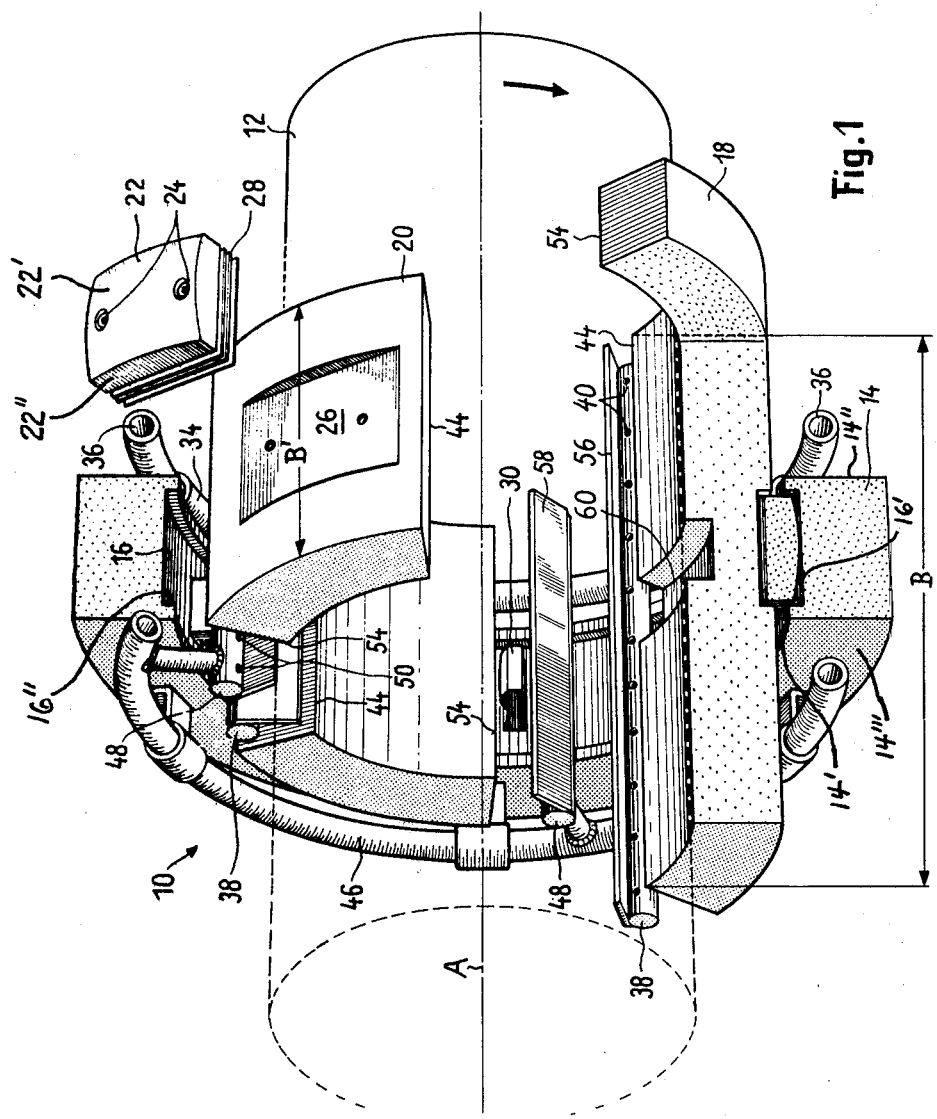
FIG. 1 is a perspective view in sectional detail, partly exploded, of a cant segment-radial bearing according to the invention.
Figure 2:
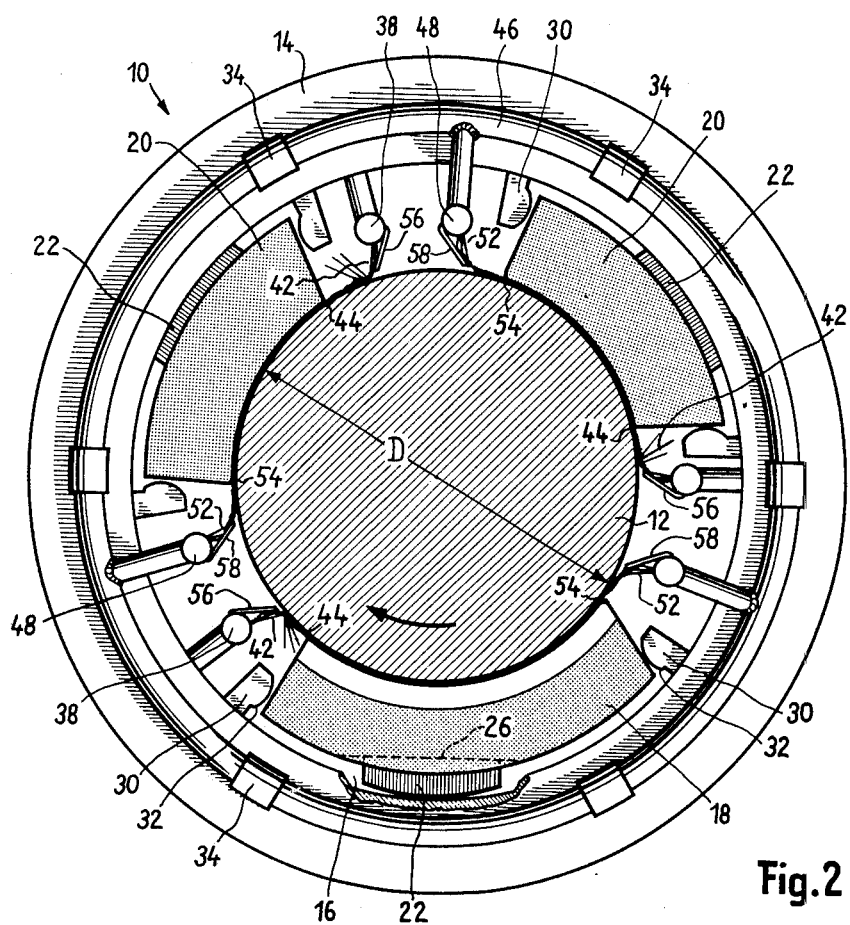
FIG. 2 is a cross-sectional view of the radial bearing shown in FIG. 1.

Describing now the drawings, it is to be understood that for purposes of simplification of illustration and clarity in understanding only enough of the details of the actual construction of the cant segment-radial bearing which are necessary for understanding the underlying principles of the invention have been shown. Turning attention to FIG. 1, the illustrated exemplarly embodiment of cant segment-radial bearing 10 will be seen to rotatably support a shaft 12 which rotates in the direction of the not particularly referenced arrow of FIGS. 1 and 2. This bearing 10 contains a conventional bearing housing, which as concerns its construction and its function of closing the internal space of the bearing from the surroundings, does not differ from the bearing housings of known cant segment-radial bearings, and therefore, need not here be further considered in detail, particularly since features of the bearing housing are totally unimportant for understanding the inventive concepts.

To simplify the illustration there has been representatively shown for the entire standard bearing housing a stationary support ring 14 which is mounted in the bearing housing or forms part of the bearing housing. The support ring 14 is provided at its radial inner surface 14' with a substantially flat annular or ring-shaped groove 16 which extends almost over its entire width. At the base 16' of the ring-shaped groove there bears a support segment 18 arranged at the lower region of the support ring 14 and two guide segments 20 arranged at the upper region of the support ring 14 by means of respective rolling or roll bodies 22. Each of the roll bodies 22 is attached by any suitable fixing means, such as threaded screws or bolts 24, at a flattened or bevelled portion 26 of the related support segment 18 or guide segment 20, as the case may be. The connection between the support segment 18 and the related roll body 22 is rigid. Between each of the guide segments 20 and the related roll body 22 there are clamped inserts 28 which render possible altering the related bearing play and/or shifting the bearing center point with respect to the axis of rotation A of the shaft 12.

Continuing, it will be observed that the roll bodies 22 have a crowned, for instance spherical-shaped outer surface 22', as best seen by referring to the upper right-hand portion of FIG. 1, and are somewhat narrower than the ring-shaped groove 16, so that they can roll at the base 16' of the ring-shaped groove 16 to all sides. In this way there are possible cant or tilt movements of the related support segment 18 and guide segments 22 both about an axis essentially parallel to the rotational axis A of the shaft 12 and also about an axis perpendicular thereto. The end surfaces 22" of the roll bodies 22 which are perpendicular to the axis A are flat and coact with the side walls 16" of the ring-shaped groove 16 in such a manner that there are imposed narrow limits upon the movements of the roll bodies 22, and thus, also the related support element 18 and guide elements 20, as the case may be, in the direction of the shaft axis A.

The degree of freedom of movement of the support element 18 and both guide segments 20 in the circumferential direction of the ring-shaped groove 16 is narrowly limited in that radially inwardly protruding dogs or protuberances 30 are attached to the support ring 14. Each of these protruberances or dogs 30 has a crowned impact or stop surface 32 for the neighboring support segment 18 or guide segment 22, as the case may be.

The support segment 18 has a width B, which measured parallel to the shaft axis A, is appreciably greater, in the illustrated embodiment approximately 1.3 times as great as the diameter D of the shaft 12 which is decisive for the design of the bearing 10. On the other hand, both of the guide segments 20 have an appreciably smaller width B', which in the illustrated embodiment, is only slightly half as large as the width B of the support segment 18.

At the one end face or side of the support ring 14, specifically the right-hand side 14" of the support ring 14 shown in FIG. 1, a first substantially ring-shaped or annular infeed line 36 is attached by means of pipe clamps 34 or equivalent structure. Cooled lubricant is infed to the lubricant infeed line or conduit 36 by means of any suitable pumping and cooling unit arranged externally of the bearing housing. This pumping and cooling unit can be of standard design and therefore has not been particularly shown; the same is true for the connections leading through the bearing housing which connect the infeed line 36 with the pumping and cooling unit and also for the connections through which the lubricant flows out of the interior of the bearing housing back to the pumping and cooling unit. At the ring-shaped infeed line 36 there are connected three nozzles tubes or pipes 38, constituting nozzle means, which in each case extend into the not particularly referenced intermediate spaces between the support segment 18 and each of both guide segments 20 and the intermediate space between both guide segments 20. These nozzle tubes 38 extend in spaced relationship from such segments 18, 20 essentially parallel to the shaft axis A. Each nozzle tube 38 has a series of nozzles 40 which are arranged such that the lubricant jets 42 emanating therefrom impinge closely behind the outlet edge 44 of the neighboring segment 18 or 20, respectively, at the shaft 12, and specifically, in the manner apparent from FIG. 2 at an inclination opposite to the direction of rotation of the shaft 12.

In corresponding manner there is secured at the other end face or side 14''' of the support ring 14, in other words the left-hand side of the support ring 14 shown in FIG. 1, a second ring-shaped lubricant infeed line or conduit 46 having three nozzle tubes 48 extending essentially parallel to the shaft axis A. The nozzles 50 of the nozzle tubes 48 are arranged such that the lubricant jets 52 emanating therefrom impinge closely before the inlet edge 54 of the neighboring segment 18 or 20, as the case may be, at the shaft 12, and then specifically at an inclination in the direction of rotation of such shaft.

Attached to each nozzle tube 38 is a screen or shield 56 which extends essentially parallel to the shaft axis A and to the symmetry plane of the lubricant jets 42 emanating from the related nozzle tube 38, in other words likewise at an inclination opposite to the direction of rotation of the shaft 12 and up to approximately the region of the shaft 12. In corresponding manner there is secured a respective screen or shield 58 at the nozzle tubes 48 which is positioned at an inclination with respect to the direction of rotation of the shaft 12.

With the illustrated width B of the support segment 18, which with is relatively large in relation to the diameter D, and in consideration of the intensive lubrication, it is necessary that the support segment 18 is subdivided at its central region by a lubricant outflow or discharge groove 60 or equivalent structure extending in circumferential direction, so that the support segment 18 behaves similar to two support segments rigidly interconnected and arranged juxtapositioned in axial direction, whose width is smaller than the diameter D.

While there are shown and described present preferred embodiments of the invention, it is to be distinctly understood that the invention is not limited thereto, but may be otherwise variously embodied and practiced within the scope of the present invention. Accordingly,

What I claim is:

1. A cant segment-radial bearing for use with heavily loaded high-speed shafts, especially turbine-generator sets and turbo drives, comprising:
   at least one support segment;
   at least two guide segments;
   means for mounting said at least one support segment to be tiltable in a load direction and said at least two guide segments in the opposite load direction;
   said support and guide segments being arranged in spaced relationship from one another so as to form therebetween intermediate spaces;
   lubricant infeed means including lubricant infeed line means for infeeding cooled lubricant under pressure to said segments;
   nozzle means connected with said lubricant infeed line means and arranged in at least one intermediate space between two of said segments; and said nozzle means producing free lubricant jets directed intermediately at the shaft with which the bearing is used.

2. The cant segment-radial bearing as defined in claim 1, further including:
means for screening the lubricant jets against lubricant which is spattering within the radial bearing.

3. The cant segment-radial bearing as defined in claim 2, wherein:
said nozzle means including at least one nozzle tube at which terminates said lubricant infeed line means;
said nozzle tube being arranged in spaced relationship from said two neighboring segments in said intermediate space thereof; and
said nozzle tube extending essentially parallel to the lengthwise axis of said shaft.

4. The cant segment-radial bearing as defined in claim 1, wherein:
said nozzle means including at least one nozzle tube at which terminates said lubricant infeed line means;
said nozzle tube being arranged in spaced relationship from said two neighboring segments in said intermediate space thereof; and
said nozzle tube extending essentially parallel to the lengthwise axis of said shaft.

5. The cant segment-radial bearing as defined in claim 4, further including:
lubricant screen means secured to each nozzle tube.

6. The cant segment-radial bearing as defined in claim 1, wherein:
said nozzle means comprises a first group of nozzles arranged immediately behind an outlet edge of at least one of the segments and opposite to the direction of rotation of the shaft and at an inclination with respect to the shaft; and
said nozzle means further including a second group of nozzles arranged immediately in front of an inlet edge of the next following segment at an inclination with respect to the direction of rotation of the shaft and directed towards said shaft.

7. The cant segment-radial bearing as defined in claim 1, wherein:
said guide segment has a width amounting to about 0.8 to 1.0 times the amount of the diameter of the shaft;
said support segment having a width which is about 1.2 to 2.2 times as large as the diameter of the shaft; and
said support segment being provided at its central region with a lubricant outflow groove which extends in the circumferential direction of said support segment.

8. A cant segment-radial bearing for use with heavily loaded high-speed shafts, comprising:
at least one support segment;
at least two guide segments;
means for tiltably mounting said at least one support segment and said at least two guide segments;
said support and guide segments being arranged in spaced relationship from one another so as to form therebetween intermediate spaces;
lubricant infeed means including lubricant infeed line means for infeeding lubricant under pressure to said segments;
nozzle means connected with said lubricant infeed line means and arranged in at least on intermediate space between two of said segments; and
said nozzle means producing free lubricant jets directed intermediately at the shaft with which the bearing is used.

9. A cant segment-radial bearing for use with heavily loaded high-speed shafts, especially turbine-generator sets and turbo drives, comprising:
at least one support segment;
at least two guide segments;
means for tiltably mounting said at least one support segment and said at least two guide segments;
said support and guide segments being arranged in spaced relationship from one another so as to form therebetween intermediate spaces;
said guide segment having a width amounting to about 0.8 to 1.0 times the diameter of the shaft with which the radial bearing is used;
said support segment having a width which is about 1.2 to 2.2 times as large as the diameter of the shaft; and
said support segment being provided at its central region with a lubricant outflow groove which extends in the circumferential direction of said support segment.

* * * * *